United States Patent [19]

Band et al.

[11] Patent Number: 4,651,439

[45] Date of Patent: Mar. 24, 1987

[54] QUILL FOR COORDINATE MEASURING MACHINES

[75] Inventors: Gerhard Band; Gunter Berger, both of Oberndorf; Kurt Walter, Alpirsbach, all of Fed. Rep. of Germany

[73] Assignee: Mauser-Werke Oberndorf GmbH, Fed. Rep. of Germany

[21] Appl. No.: 765,372

[22] Filed: Aug. 13, 1985

[30] Foreign Application Priority Data

Aug. 16, 1984 [DE] Fed. Rep. of Germany ....... 3430086
May 2, 1985 [DE] Fed. Rep. of Germany ....... 3515685

[51] Int. Cl.⁴ .............................................. G01B 5/00
[52] U.S. Cl. ...................................... 33/559; 33/503; 33/556
[58] Field of Search ................. 33/503, 559, 556, 558, 33/560, 561, 551, 1 M, 169 R, 172 R; 308/3 A

[56] References Cited

U.S. PATENT DOCUMENTS 3,286,353 11/1966 Potter ..................................... 33/503
3,831,283 8/1974 Pagella et al. ......................... 33/559
4,095,079 6/1978 Ullmann et al. ................. 308/3 A Y
4,466,195 8/1984 Herzog ................................... 33/503

FOREIGN PATENT DOCUMENTS 3107783 9/1982 Fed. Rep. of Germany .
2487931 2/1982 France .

Primary Examiner—Harry N. Haroian
Attorney, Agent, or Firm—McGlew and Tuttle

[57] ABSTRACT

The invention relates to a quill for coordinate measuring machines of square cross-section and guided by a total of eight bearing parts within a guiding part. Three bearing parts which bear against quill surfaces are located adjacent the upper and in the lower ends of the guide surfaces in the guiding part. Two more bearing parts are provided in a Z direction approximately between the upper and lower bearing parts. Due to the special configuration of the bearing parts relative to each other and the horizontally acting springs inserted in certain bearing parts the twisting of the quill is determined and also the specified quill twisting accuracy of two angular seconds max. is obtained.

11 Claims, 5 Drawing Figures

QUILL FOR COORDINATE MEASURING MACHINES

FIELD AND BACKGROUND OF THE INVENTION

The invention relates to a quill for coordinate machines of an essentially rectangular, in particular squire cross-section, guided in bearing parts so as to be movable in a Z direction and accommodating a measuring feeler at its lower end.

Similar quills are disclosed in German No. OS 31 07 783 in the introductory description thereof. In order to reduce the weight of such quills it has been suggested in German No. OS 31 07 783 to depart from the square section of the quill and produce a quill of triangular section instead. In comparison with the square, and also in comparison with the generally known circular cylinder form, a triangular section presents less surface, whereby a corresponding weight reduction is achieved.

The new VDI acceptance guidelines for three coordinate measuring instruments provide a test for quills, allowing a maximum of two angular seconds for the twist angle or roll angle accuracy. This extraordinarily high accuracy is not attainable in the known quill designs with triangular or round section, or is attainable only at extremely high expense for assembly and adjustment. Maintaining the specified accuracy is problematical especially if, in large measuring machines, the quill is to be extended in the Z direction over a long distance of, say, two meters or more.

SUMMARY OF THE INVENTION

The invention provides a quill for coordinate measuring machines which makes an accuracy for the twist angle of less than two angular seconds possible by relatively simple means and also in mass production.

According to the invention, the quill is equipped with a Z scale and is guided in at least eight bearing portions in a guiding part, of which, at least three bearing parts each are disposed in both the upper and lower end zones of the guiding part in one cross-sectional plane and mutually parallel in a Z direction, while two more bearing parts are provided approximately in the middle between the bearing parts spaced in the Z direction, in a cross-sectional plane and offset in the Z direction relative to the upper and lower bearing parts. Two each of the upper and lower bearing parts are disposed catticorner on the surfaces adjacent to each other at right angles, while the third bearing part in the same cross-sectional plane is provided at the diagonally opposite corner, forming a V with the first two bearing parts, and the bearing parts installed approximately in the middle between the upper and lower bearing parts in the Z direction are provided on the same guide surface as the two first mentioned upper and lower bearing parts, but in the area associated with the respectively opposite corner.

In an ornamental and structurally different embodiment, four each bearing parts may be provided on each of the four guide surfaces in both the upper and lower end zones of the quill, while in the central quill zone two more bearing parts, offset by 90° on the respective guide surfaces, are installed additionally in a Z direction between the upper and lower bearing parts.

In an embodiment of the invention, the bearing parts provided catti-corner and centrally may be installed at or near the outside edges of the guide surfaces. Furthermore, the two bearing parts in the corner and one of the centrally disposed bearing parts may be spring loaded in the horizontal plane.

In yet another embodiment, the quill is chamfered at its four corners. To ensure perfect guidance and prevent twisting of the quill, a spring loaded bearing part each may be installed opposite the upper and lower fixed bearings, while a sprung bearing part, offset by 90°, is coordinated with the central bearing.

The prevent corrosion when air bearings are used, the guide surfaces are chemically nickleplated. If the bearings are designed as revolving ball shoes instead, the guide surfaces of the quill will be hardened in a further development of the invention.

With these inventive features safe adherence to and attainment of the desired maximum quill twist are assured through a larger guidance base of the square quill shape and the appropriate arrangement of the guide elements. The employment of revolving ball shoes or air bearings advantageously prevents the quill from heating up. With the three point bearing in one cross-sectional plane precise guidance of the quill is obtained. The reliable determination of the quill rotation is obtained, for instance, by one revolving ball shoe being fixed and the other revolving ball shoe in the respective horizontal plane being sprung. Due to the installation of the bearing parts near the edge of the guide surfaces a broad bearing surface and, hence, increased accuracy are obtained. The use of the springs allows, through spring layering or the employment of special springs, to make the contact pressure of the bearings against the quill available. If air bearings are used instead of the revolving ball shoes, a weight reduction is possible in addition.

A commercially available square tube is advantageously started with outsides which are machined by chip removal, thereby arriving at the required outside size for insertion of the quill into the quidance parts. For this purpose the four corners of the quill body are chamfered. Usually, this chamfer is insufficient to accommodate a bearing part and thereby obtain in simple manner a three-point bearing in one single cross-sectional plane.

It is only through the feature according to the invention, namely to mount in both the upper and lower quill zones four each bearing parts on the four lateral guide surfaces and, additionally, to provide opposite each fixed bearing a spring loaded bearing part, that adequate guidance of the quill is achieved. This design according to the invention allows further the use of commercially square tubing, whereby the technical cost of producing a special quill is significantly reduced. Due to the centrally disposed bearing parts mutually standing at right angles, good protection against quill twisting with precisely defined quill guidance is achieved.

Accordingly, it is an object of the invention to provide an improved guidance for a measuring quill which is adapted to have a measuring feeler and which is guided in a guiding part on bearings arranged at three separate longitudinally spaced apart zones including an upper zone having bearings which are at right angles to each other adjacent one corner of the quill and at least one of which is spring loaded with bearing means at an opposite corner which is also spring loaded and both the upper and lower ends of the quill and additional bearing means intermediate the upper and lower ends which act adjacent to diametrically opposite corners which are not the same of the corners as the upper and lower ends and which includes spring loaded bearings on at least one of these corners.

A further object of the invention is to provide quill for cooridinate measuring machines which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
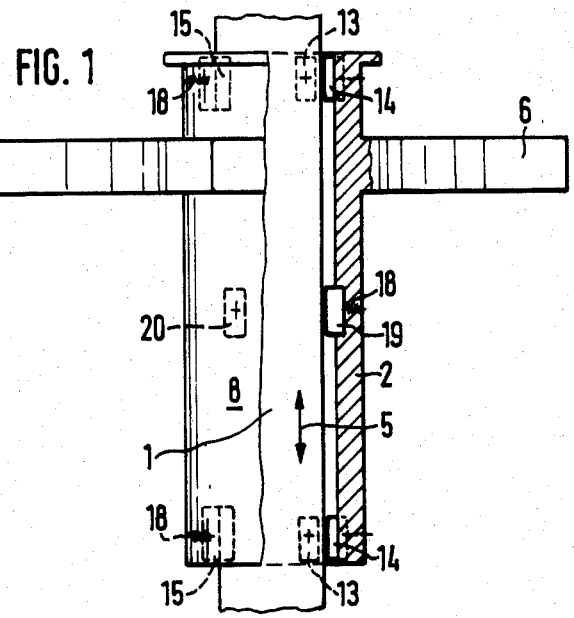
FIG. 1 is a side elevational view of a quill partly in longitudinal section constructed in accordance with the invention.

Referring to the drawings in particular, the invention embodied therein comprises a quill generally designated 1 for coordinate measuring machines which is adapted to contain a measuring feeler 4 at its lower end and which is guided in a guiding part 2 on bearings which are located at three spaced apart bearing zones. The bearing zones include an upper bearing zone in which two first bearings 13 and 14 act at right angles to each other adjacent a first corner area 16 between first side surfaces 10 and 11 of the quill 1. Second bearings comprise bearings 15 biased by springs 18 against a flattened second corner area 17 so that they are diagonal to the corner 16.

A lower bearing zone is provided with bearings similar to the first bearing in an arrangement similar to the upper bearing zone.

The arrangement also includes an intermediate bearing zone in which there are intermediate bearings 19 and 20 which operate adjacent corners 21 and 22 which are diagonally opposite to each other and which are not the same corners as in the upper and lower zones and which act on surfaces 10 and 11 at right angles to each other. Quill 1 which also includes surfaces 8 and 9 which are opposite the surfaces 10 and 11 respectively and the surface 9 is advantageously provided with a Z scale.

Figure 4:
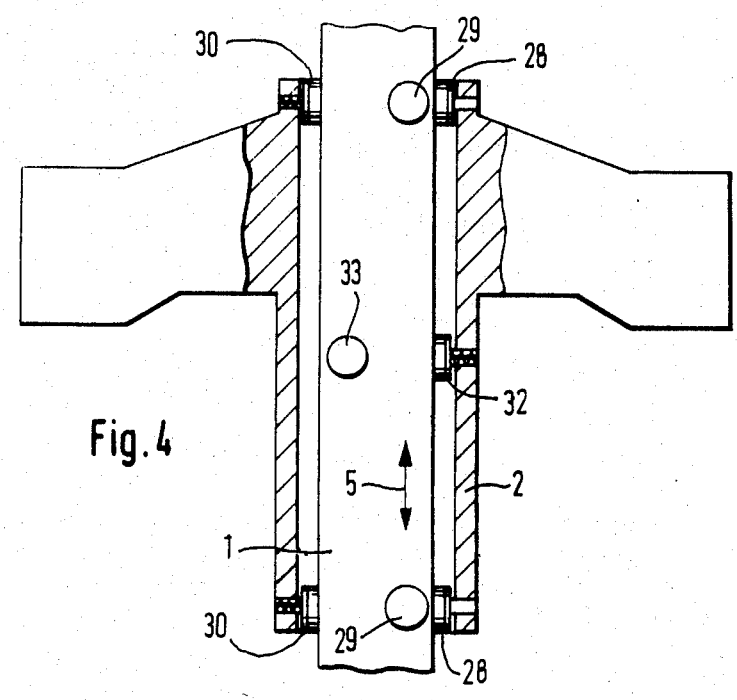
FIG. 4 is a partial sectional and elevational view of another embodiment of a quill.
Figure 5:
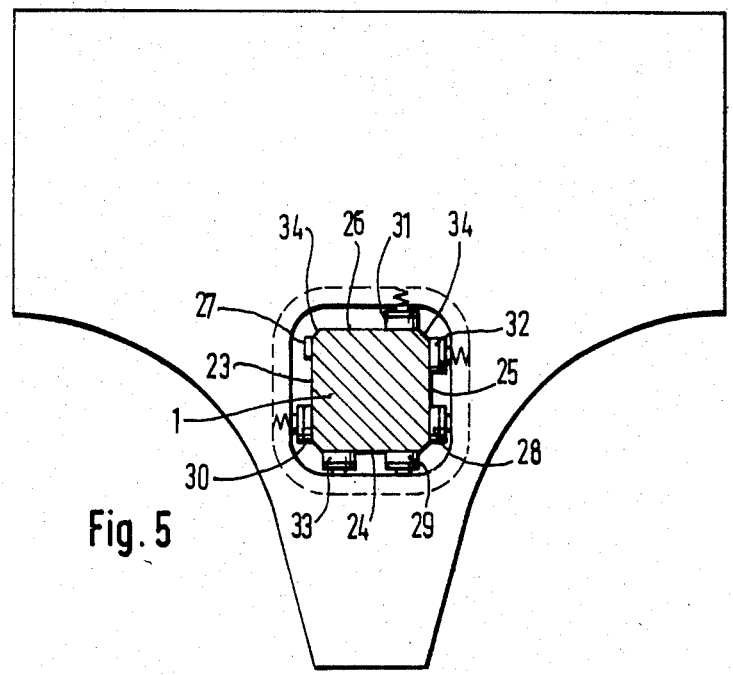
FIG. 5 is a partial horizontal sectional and top view of the quill shown in FIG. 4.

In the embodiment of FIGS. 4 and 5, the upper bearing zone includes first bearings 28,29 which act at one end of a first surface 24 and 25 and second bearings, 31 which acts at an opposite second surfaces 23, 26 in a corner area adjacent the surfaces 24, 25 and they are advantageously spring biased. In the intermediate zone intermediate bearings 32 and 33 act on surfaces 25 and 24 at diagonally opposite corners and one of them, 32, is advantageously spring biased.

A quill 1 is guided in a guiding part 2 of a coordinate measuring machine. Fastened to the lower face end of the quill is a measuring feeler 4. The quill 1 is movable in a Z direction by a drive located at the upper end and not detailed here. The motion of the measuring feeler 4 in Y direction is accomplished by a built-in carriage 6 while mobility in X direction occurs through the entire portal 7 of the measuring machine 3.

Now, in accordance with its square cross-section, the quill 1 has four side surfaces 8,9,10,11 which at the same time represent guide surfaces. The Z scale 12 is provided on the one side surface 9.

The bearing parts are shown schematically. In both the upper and lower end zones of the guiding part 2 the bearing parts 13, 14, 15 designed in the form of revolving ball shoes as three point bearings, are shown in one cross-sectional plane each. The bearing parts 13 and 14 are disposed catti-corner on respective guide surfaces 10 and 11 adjacent to each other and at right angles of corner 16, both in the upper and lower end zones of the guiding part 2. Diagonally opposite the corner 16 of the quill 1, at the flattened corner 17, another bearing part 15 is disposed at the same level as the bearing parts 13 and 14. This bearing part 15 in both the upper and lower end zones of the guiding part has horizontally acting springs 18.

In a Z direction shown by the double arrow 5, approximately in the middle between the upper and lower bearing parts 13,14,15 are two more bearing parts 19 and 20. The bearing part 19 is active on the same guide surface 11 as the bearing part 14. But it contacts the edge or corner 21 of quill 1 opposite the bearing part 14. Like the bearing part 15, the bearing part 19 is supported by a horizontally acting spring 18. The bearing part 20 is located on the guide surface 10 which also accommodates the bearing part 13. Here again, the bearing part 20 is disposed adjacent the edge or corner 22 of the quill opposite the bearing part 13.

A total of eight guiding elements is provided in the above described arrangement of the bearing parts 13, 14, 15, 19, 20. In each of the upper and lower end zones of the guiding part 2 are located three bearing parts 13,14,15, of which the bearing parts 15 disposed at the flattened corner 17 are spring loaded. The two other bearing parts 19 and 20 are located in the center of the perpendicular of the guide plane, one of which, namely bearing part 19, again being supported by a spring 18. The three point bearing thus obtained for each upper and lower guide surface assures great guiding accuracy. The quill twisting is determined by the bearing parts 19 and 20, one of which is rigid and the other sprung. The contact pressures of the bearing parts against the guide surfaces of the quill 1 are controllable through the inserted springs 18.

If a weight reduction is desired, the revolving ball shoes used may be replaced by air bearings as bearing parts.

Figure 2:
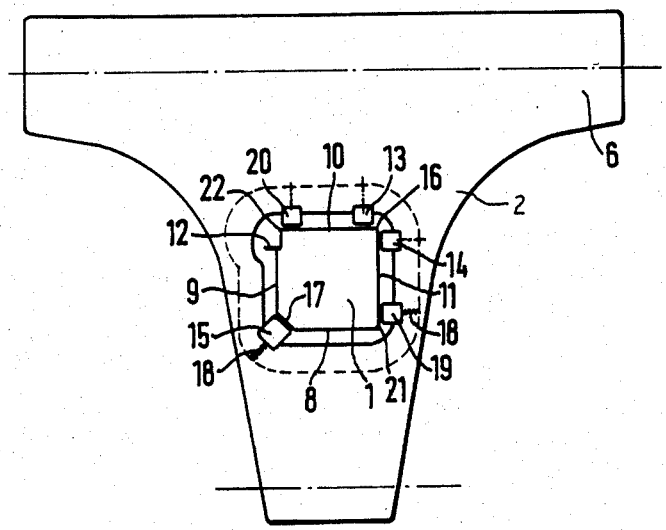
FIG. 2 is a top view of the quill of FIG. 1.
Figure 3:
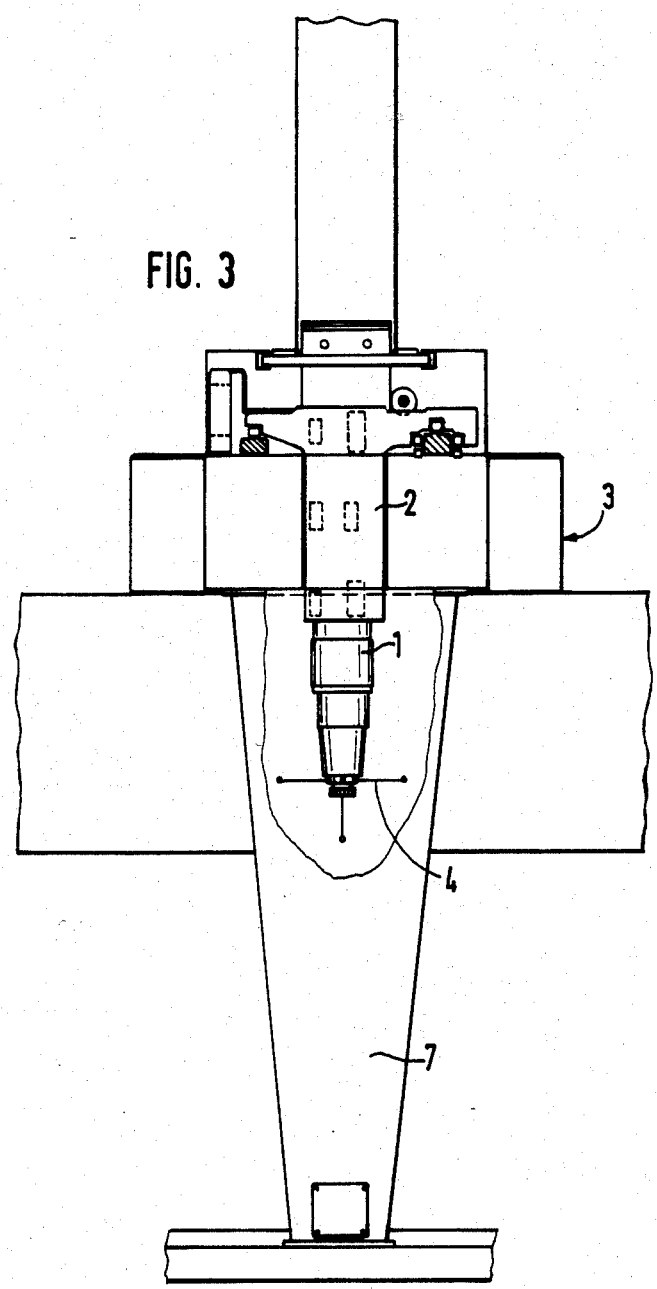
FIG. 3 is a side elevational view partly in section of the quill according to the invention when used in a measuring machine.

FIGS. 4 and 5 show an alternate embodiment of the invention, the differences relative to FIGS. 1 and 2 being essentially in the number and arrangement of the bearing parts. According to FIGS. 4 and 5 also, a quill 1 is guided in a guiding part 2 of a coordinate measuring machine 3 (not detailed). Again, a measuring feeler, (not detailed) is fastened to the lower face end of the quill 1. The quill 1 can move in the Z direction. The movements of the measuring feeler in Y direction are accomplished via a built-in carriage while the mobility in the X directions occurs through the entire portal of the measuring machine.

Now, in accordance with its square cross-section, the quill 1 has four lateral guide surface 23, 24, 25, 26. The Z scale 27 is mounted to the one guide surface.

In both the upper and lower end zones of the quill 1 or the guiding part 2 are provided the bearing parts 28, 29, 30, 31, 32, 33, designed as air bearings, as three point bearings in one cross-sectional plane each. There is a total of four bearing parts 28, 29, 30, 31 on the four lateral guide surfaces 23, 24, 25, 26 of the quill 1 in each of the upper as well as lower end zones of the guiding part 2. Coordinated with each fixed bearing 28, 29 there is a spring loaded bearing part 30, 31. The fixed bearings 28 and 29 are always disposed opposite the spring loaded bearing parts 30 and 31 on the side surfaces of the quill 1. This arrangement of four bearing parts 28, 29, 30, 31 each in the upper and lower area of the guiding part 2 replaces the catticorner arrangement of bearing parts.

When, however, a commercially available square tube is used to produce the quill 1 whose outside, for instance, must be machined by chip removal to be able to insert it in the guiding part 2, the chamfers 34 provided at the four corners of this quill body 1 are insufficient to accommodate a bearing part. If the technically and economically favorable solution of commercial square tubing is to be utilized just the same, the invention still provides the possibility of precise guidance of the quill 1 in the guiding part 2 and good protection against twisting of the quill 1 despite the elimination of catti-corner bearing parts. Responsible for this antitwisting protection of the quill 1 are essentially the two central bearing parts 32 and 33 disposed on two guide surfaces 24 and 25 of the quill 1 which stand at right angles to each other. Here again, one bearing part 33 forms a rigid bearing while the other bearing part, offset to the former by 90°, again represents a spring loaded bearing part 32.

To prevent corrosion in case the bearing parts are designed as air bearings, the guide surfaces 23, 24, 25, 26 of the quill 1 are chemically nickleplated.

In the event the bearing parts 28, 29, 30, 31, 32, 33 are revolving ball shoes, the guide surfaces 23, 24, 25, 26 of the quill 1 are hardened.

While specific embodiments of the invention have been shown and described in detail to illustrate the application of the principles of the invention, it will be understood that the invention may be embodied otherwise without departing from such principles.

What is claimed is:

1. A quill construction for coordinate measuring machines, comprising a guide having a bore, a quill of substantially rectangular cross-section having means for accommodating a feeler adjacent its lower end and guided in said bore for movement in a Z-direction, said quill having a surface provided with a Z-direction scale, said quill having two mutually perpendicular first surfaces connected to each other at a first corner area, two mutually perpendicular second surfaces connected to each other at a second corner area which is diametrically opposite said first corner area, said first surfaces being connected to said second surfaces at two diametrically opposite third corner areas, said surfaces extending in the Z-direction, said quill having upper, intermediate and lower bearing zones spaced in the Z-direction, at least two first bearings engaged between said guide and said quill in each of said upper and lower zones, each of said at least two first bearings engaged against one of said first surfaces, at least oen second bearing engaged between said guide and said quill in each of said upper and lower bearing zones and each engaged against one of said second surfaces and second corner area for counteracting forces of said first bearings in said upper and lower bearing zones, and two intermediate bearings engaged between said guide and said quill in said intermediate bearing zone, each intermediate bearing engaged against one of said first surfaces between said first bearings on each of said first surfaces and out of vertical alignment with said first bearings on each of said first surfaces, each of said first, intermediate and second bearings slidably supporting said quill for movement in the Z-direction on said guide.

2. A quill according to claim 1 wherein said first bearings in said upper and lower zones are each adjacent said first corner area, said intermediate bearings in said intermediate zone each being adjacent one of said third corner areas.

3. A quill according to claim 2 wherein said second corner area is flattened, said second bearing acting in said upper and lower bearing zones against said flattened second corner area.

4. A quill according to claim 2 wherein said at least one second bearing in said upper and lower bearing zones engages against one of said second surfaces adjacent one of said third corner areas, and additional second bearings in each of said upper and lower bearing zones engaged against the other of said second surfaces adjacent the other of said third corner areas, said intermediate bearings each being acjacent one of said third corner areas.

5. A quill according to claim 1 wherein each of said intermediate bearings adjacent one of said third corner areas.

6. A quill according to claim 1 wherein at least one of said first bearings and at least one of said second bearings in spring loaded, at least one of said intermediate bearings is spring loaded, all other bearings being fixed to said guide.

7. A quill according to claim 1, wherein said bearings are located at corner areas and one of said intermediate bearings are spring loaded in a horizontal plane.

8. A quill according to claim 1, wherein said quill has a chamfer on each of its corner areas.

9. A quill according to claim 1, wherein said surfaces of the quill are chemically nickle-plated.

10. A quill according to claim 1, wherein said bearings include air bearings.

11. A quill according to claim 1, wherein revolving ball shoes guided on a hard surface of said quill are used as bearings.

* * * * *